United States Patent [19]

Mattox

[11] Patent Number: 4,923,249
[45] Date of Patent: May 8, 1990

[54] BABY CHAIR SUNSHADE

[76] Inventor: Elizabeth A. Mattox, 17230 N. 20th St., Phoenix, Ariz. 85022

[21] Appl. No.: 251,749

[22] Filed: Oct. 3, 1988

[51] Int. Cl.⁵ ............................................. A47C 7/10
[52] U.S. Cl. ................................... 297/184; 296/97.5; 296/97.8
[58] Field of Search ...................... 297/184, 95.1, 174, 297/135; 296/97.7, 97.1, 97.8, 97.5; 5/414, 416; 135/900, 90; 160/370.2; 248/441.1

[56] References Cited

U.S. PATENT DOCUMENTS

| 1,339,527 | 5/1920 | Sperling et al. | 5/416 |
| 3,279,845 | 10/1966 | Lutz | 160/370.2 |
| 4,583,779 | 4/1986 | Myers | 297/184 |

FOREIGN PATENT DOCUMENTS

| 2655028 | 6/1978 | Fed. Rep. of Germany | 297/184 |
| 594730 | 6/1925 | France | 297/184 |

Primary Examiner—Jose V. Chen
Attorney, Agent, or Firm—James F. Duffy

[57] ABSTRACT

What has been disclosed is a portable, foldable sunshade for use in protecting a person from exposure to the sun. Sunshielding side supports retain the sunshade above the head of a person who is seated in a chair. The side supports, positioned between the person and the side of the chair, are adjustable for shielding the person from oblique rays of the sun.

9 Claims, 1 Drawing Sheet

BABY CHAIR SUNSHADE

BACKGROUND

1. Field of the Invention

The invention relates to the field of sun-shielding devices. Particularly, the invention relates to a portable sunshade having supports insertable between the sides of a chair and the body of a person seated in said chair. The invention finds its greatest use with baby supports such as children's car seats and baby carriers.

2. Prior Art

The following patents were found in a search of the prior art:

| Inventor | U.S. Pat. No. | Issued |
| --- | --- | --- |
| Griffin | 206,670 | 8/6/1878 |
| Boggs et al | 3,840,161 | 10/08/74 |
| Biven | 4,112,957 | 09/12/78 |
| Koenig | 4,579,385 | 04/01/86 |
| Davis et al | 4,733,906 | 03/29/88 |

Each of these patents discloses a sun shading device, highly specialized in construction, not readily adaptable for use with apparatus other than that with which each individual sunshade is disclosed.

It is an object of the present invention to provide a sunshade adaptable to seating structures of various styles and configurations. In addition, it is desired that the sunshade shall be capable of such low cost fabrication that it may be disposed of and easily replaced. The sunshade is conceived as a readily portable and adaptable device.

SUMMARY OF THE INVENTION

The invention may be summarized as a sunshade for protecting a person from adverse exposure to the sun. The shade is disclosed and claimed as comprising sunshading means supportable above a person to be shaded; and, support means, emplacable adjacent that person and extending upwards above the head of that person, coupled to the sunshading means for supporting the sunshading means above that person's head.

In a preferred embodiment, the sunshading means is comprised of a planar paper product.

The invention is disclosed as further comprising means for rotating the support means about the sunshading means for ease of transport and storage of the sunshade.

Other embodiments of the invention are disclosed and claimed as follows:

A sunshade wherein the support means comprises a first support means emplacable adjacent a first side of a person to be shaded; and second support means emplacable adjacent a second side of a person to be shaded; the first and the second support means each comprise a sunshading dimension for shading a person from sun rays obliquely approaching a person; the sunshading means and the support means are comprised of planar paper products; and, there are included means for rotating the support means about the sunshading means for ease of transport and storage of the sunshade.

Another embodiment claims the sunshade further comprising, in combination therewith a chair having sides rising adjacent either side of a person seated in the chair; and, the support means comprise a first support means emplacable adjacent both one of the sides and a first side of a person to be shaded while seated in the chair; and second support means emplacable adjacent both another one of the sides and a second side of a person to be shaded while seated in the chair.

DETAILS OF THE INVENTION

Figure 3:
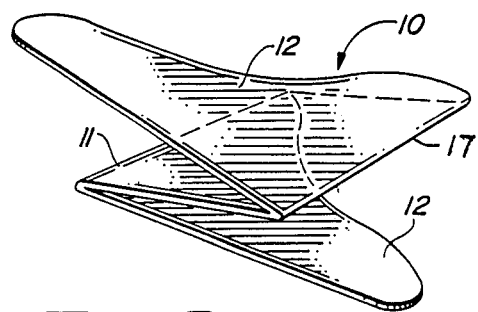
FIG. 3 illustrates the manner in which the sunshade may be embodied of storage and transport.

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention partains.

As an example of the foregoing, it is noted that the invention is disclosed in combination with a child's seat. Various types of child carriers, whether intended for carriage by hand or in a vehicle, are intended to fall within the scope of the claimed invention. Further, while the embodiment selected for disclosure is a child's seat, no limitation is thereby intended as to the type of seat or structure with which the invention may be utilized.

Figure 1:
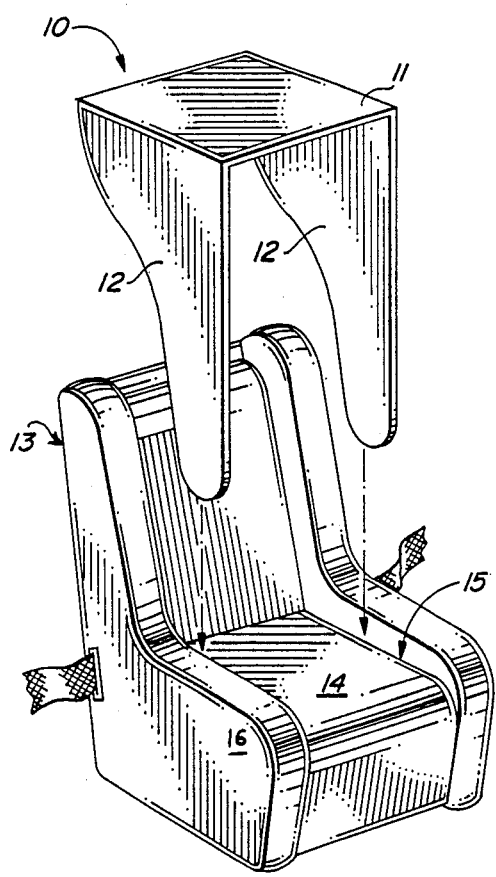
FIG. 1 is a perspective view of a generalized embodiment of a child's seat showing the innovative sunshade about to be emplaced therein.

In FIG. 1, the invention is seen as a sunshade 10 having a top, shade-casting surface 11 and sun-shielding, side supports 12. Sunshade 10 is about to be emplaced into a structure which will retain side supports 12 in a generally upright position and top surface 11 in a generally horizontal position, in the depiction of FIG. 1.

The subject structure into which sunshade 10 is to be emplaced is child's chair, or seat, 13 having side supports 16 which rise above and encompass the seating surface, or cushion, 14. When a person is seated in chair 13, sun-shielding, side supports 12 tend to be retained in place between the person's body and the sides 16 of chair 13.

Figure 2:
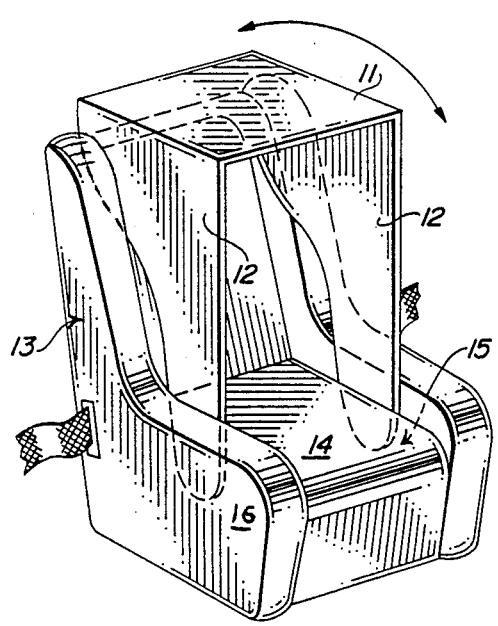
FIG. 2 illustrates in perspective the sunshade emplaced in the child of FIG. 1.

Frequently, there is an internal void, or confined space, 15 between chair side 16 and seat cushion 14. By inserting a portion of side supports 12 into spaces 15 (see FIGS. 2 & 4), sunshade 10 is maintained in place even when there is no person seated in chair 13, due to the typical snug fit of cushion 14 between chair sides 16.

Figure 4:
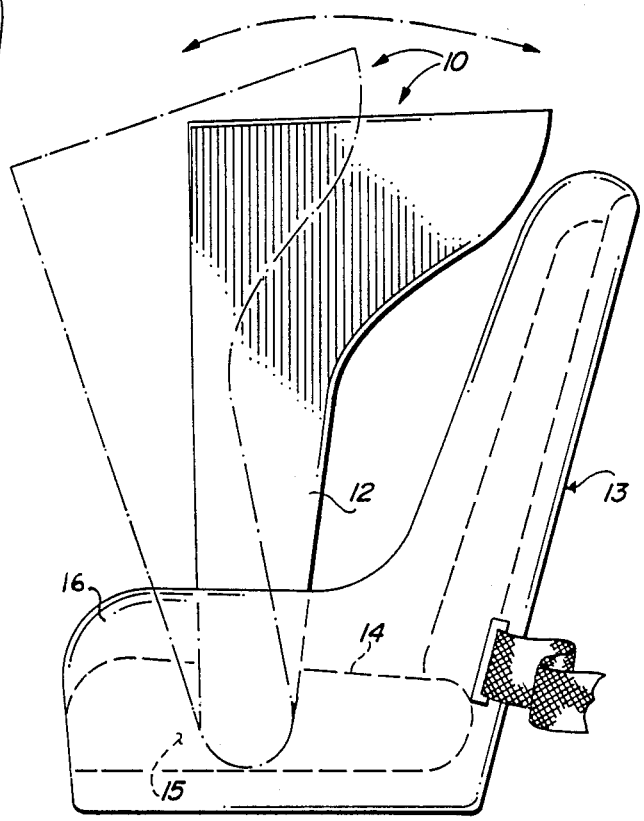
FIG. 4, a side elevation, indicates the manner in which the sunshade may be adjusted to provide sun protection for variations in the sun's position.

With side supports 12 snugly maintained in place by body pressure of a person seated in chair 13 or the pressure arising from the snug fit of support 12 within confined space 15, the retaining pressure remains sufficiently low as to permit sunshade 10 to be angularly adjusted by rotation, FIG. 4, to compensate for the sun's location and provide shade to the person seated in chair 13.

The presently preferred use of the invention is with chairs and seats, and the like, used by infants and small children. Typically, these devices, unlike baby carriages and strollers, are not equipped with means for protecting the child from exposure to the sun. Most frequently, the problem presents itself when the child is seated in a child's seat in an automobile. The auto's sun visors are not designed to protect such small occupants. Sunshade 10 is admirably suited for such service. It does not interfere with the child's movement and may be readily adjusted to the proper angle for blocking the sun's rays. In addition to the top surface 11, side supports 12 supply significant sun shielding.

Side supports 12 are contoured to generally conform to the contours of many chairs 13 and to approximate the contours of many others, (FIG. 4). When sunshade 10 is in an upright position, as in FIG. 2, a person seated within chair 13 is protected from many environmental distractions, which might otherwise be seen or heard. Thus, in addition to protecting one from the sun, sunshade 10 offers a quiet, restful space for relaxation.

To further increase the utility of sunshade 10, it may be fabricated with an impressed fold line 17 so as to fold for ease of transport and storage. See FIG. 3. If sunshade 10 is made of a material such as pressed board, cardboard, or the like, the foldability is readily achieved while reasonable costs are assured.

What has been disclosed is a portable, foldable sunshade for use in protecting a person from exposure to the sun. Sunshielding side supports retain the sunshade above the head of a person who is seated in a chair. The side supports, positioned between the person and the side of the chair, are adjustable for shielding the person from oblique rays of the sun. Those skilled in the art will conceive of other embodiments of the invention which may be drawn from th e disclosure herein. To the extent that such other embodiments are so drawn, it is intended that they shall fall within the ambit of protection provided by the claims herein.

Having described the invention in the foregoing description and drawings in such a clear and concise manner that those skilled in the art may readily understand and practice the invention, that which is claimed is:

1. A sunshade and chair combination comprising:
   a shade-casting surface for shading a person seated in a chair;
   a chair having left and right sides, a seat cushion inserted in between said left and right sides, a first space defined between said left side and said cushion, and a second space defined between said right side and said cushion; and
   support means coupled to said surface and removably inserted in at least one of said first and said second spaces for supporting said surface above a person seated in said chair.

2. The combination of claim 1 wherein said support means is also inserted in and pivotal within at least one of said first and second spaces for rotatingly supporting said surface to shade a person seated in said chair from oblique rays of the sun.

3. The sunshade of claim 2 wherein said support means has a sun-shading width for shading the side of a person seated in said chair.

4. The sunshade of claim 3 wherein said shade-casting surface and said support means comprise a planar paper product.

5. The sunshade of claim 4, further comprising means for folding said surface and said support means, one with respect to the other, for ease of transport and storage.

6. The combination of claim 1 wherein said support means comprises first and second support members said first support member inserted in and pivotal within said first space, said second support member inserted in and pivotal within said second space.

7. The sunshade of claim 6 wherein each said first and second support members has a sun-shading width.

8. The sunshaft of claim 7 wherein said shade-casting surface and each of said first and second support members comprises a planar paper product.

9. The improvement of claim 8 further comprising means for folding said surface and each of said first and second support members, each with respect to all others, for ease of transport and storage.

* * * * *